US012582950B2

(12) United States Patent
Tölle et al.

(10) Patent No.: US 12,582,950 B2
(45) Date of Patent: Mar. 24, 2026

(54) INDUSTRIAL MIXING MACHINE

(71) Applicant: Dr. Herfeld GmbH & Co. KG, Neuenrade (DE)

(72) Inventors: Matthias Tölle, Neuenrade (DE); Andre Brodt, Neuenrade (DE); Andreas Kottler, Neuenrade (DE)

(73) Assignee: Dr. Herfeld GmbH & Co. KG, Neuenrade (DE)

( * ) Notice: Subject to any disclaimer, the term of this patent is extended or adjusted under 35 U.S.C. 154(b) by 792 days.

(21) Appl. No.: 17/993,705

(22) Filed: Nov. 23, 2022

(65) Prior Publication Data

US 2023/0166225 A1 Jun. 1, 2023

(30) Foreign Application Priority Data

Dec. 1, 2021 (DE) ..................... 10 2021 131 517.4
Oct. 18, 2022 (EP) .................................... 22202208

(51) Int. Cl.
*B01F 33/82* (2022.01)
*B01F 33/00* (2022.01)
*B01F 35/60* (2022.01)

(52) U.S. Cl.
CPC ............ *B01F 33/823* (2022.01); *B01F 33/86* (2022.01); *B01F 35/6052* (2022.01)

(58) Field of Classification Search
CPC .. B01F 35/605; B01F 35/6052; B01F 33/823; B01F 33/86
See application file for complete search history.

(56) References Cited

U.S. PATENT DOCUMENTS 8,678,639 B2 3/2014 Tolle et al.
8,979,354 B2 3/2015 Tolle et al.
(Continued)

FOREIGN PATENT DOCUMENTS

DE 4422086 C1 * 9/1995 ............. A47J 43/06
DE 102013111158 B3 11/2014
(Continued)

OTHER PUBLICATIONS

Intention to Grant dated Dec. 20, 2023 in related European application No. 22202208.9.

*Primary Examiner* — Marc C Howell
(74) *Attorney, Agent, or Firm* — Polson Intellectual Property Law P.C.; Margaret Polson; Christopher Sylvain

(57) ABSTRACT

An industrial mixing machine is disclosed for mixing material to be mixed in mixing containers that are open on the connection side and differ in at least one feature of their design, wherein one mixing container is attachable in each case to the mixing head of the mixing machine for mixing the material to be mixed contained therein, and wherein at least two mixing tools differing in at least one feature of their design are mountable on a mixing head of the mixing machine. The mixing machine has a detection device which is configured to determine whether the mixing tool currently mounted on the mixing head matches with the mixing container which is to be connected to the mixing head and in which the material to be mixed is located, and a safety device in communication with the detection device, which prevents the mixing tool and the mixing container opening from being brought together when the detection device detects that the mixing tool mounted on the mixing head does not match with the mixing container.

16 Claims, 10 Drawing Sheets

(56) References Cited

U.S. PATENT DOCUMENTS

| | | | | |
|---|---|---|---|---|
| 9,950,301 | B2 | 4/2018 | Ruberg et al. | |
| 9,968,897 | B2 | 5/2018 | Tolle | |
| 10,071,351 | B2 | 9/2018 | Ruberg et al. | |
| 10,265,669 | B2 | 4/2019 | Ruberg et al. | |
| 11,059,005 | B2 | 7/2021 | Ruberg et al. | |
| 11,224,848 | B2 | 1/2022 | Ruberg et al. | |
| 2007/0085496 | A1 * | 4/2007 | Philipp | B01F 35/22161 318/139 |
| 2009/0084274 | A1 * | 4/2009 | Kovacic | A47J 43/06 99/348 |
| 2017/0172348 | A1 * | 6/2017 | Vu | B01F 35/53 |
| 2017/0246604 | A1 * | 8/2017 | Sollazzo Lee | B01F 27/88 |
| 2018/0368622 | A1 * | 12/2018 | Widanagamage Don | A47J 43/07 |
| 2021/0060504 | A1 | 3/2021 | Ruberg | |
| 2022/0117444 | A1 * | 4/2022 | Tareen | H02P 23/00 |

FOREIGN PATENT DOCUMENTS

| | | | |
|---|---|---|---|
| DE | 202021101371 | U1 | 3/2021 |
| EP | 0225495 | A2 | 6/1987 |

* cited by examiner

INDUSTRIAL MIXING MACHINE

CROSS REFERENCE APPLICATIONS

This application is a non-provisional application claiming priority to German application 20 2021 106 516.8 filed Nov. 30, 2021; German application 10 2021 131 517.4 filed Dec. 1, 2021, German application 20 2022 100 646.6.8 filed Feb. 4, 2022; and European Patent Office application 22202208.9 filed Oct. 18, 2022, which are all hereby incorporated by reference for all purposes.

BACKGROUND

Industrial mixing machines are mixers that are used to mix bulk material, typically powdered bulk material that is used for producing mixtures of plastic granulated mixtures or in the dye industry for example. Such mixing machines typically have a mixing head pivotable in relation to a frame, which is used in several designs to simultaneously close a mixing container containing the material to be mixed, which container is attached to the mixing head for the purpose of mixing a material to be mixed located therein. After the mixing container has been attached to the mixing head, a closed mixing receptacle is formed from the mixing head and the mixing container containing the material to be mixed.

A mixing tool for mixing the material to be mixed is also mounted on the mixing head or on a drive shaft. This mixing tool is adapted according to the material to be mixed and/or the size of the container. The mixing tool is set into a rotational movement by the drive shaft in order to mix the material to be mixed.

The mixing tool has an attachment area for attaching a mixing tool to the drive shaft. In many cases, this is formed complementary the drive shaft, which in this case acts as a fitting on the mixing machine side, and is fastened thereon using screws, for example.

The mixing head itself is pivotably arranged in relation to a machine frame of the mixing machine so that the mixing can take place in an inverted position in relation to the mixing head, in which the mixing head is arranged at the bottom and the mixing container attached thereon is arranged at the top. This inverted position is required so that the material to be mixed contained in the mixing container comes into contact with the mixing tool mounted on the mixing head. The rotationally driven mixing tool is used to generate a flow of material to be mixed inside the closed mixing chamber. Such an industrial mixer is known, for example, from EP 0 225 495 A2.

It is problematic for such a mixing machine and in particular for the mixing tool when different containers, which differ in at least one feature of their design, and different materials to be mixed are to be mixed on the same mixing machine. If the containers are of different sizes and/or the material to be mixed differs such that different mixing methods have to be carried out, different mixing tools are used, which differ in at least one feature of their design, such as in their diameter, their material, their intended use, or another feature. It is common for mixing tools and mixing containers to be designed differently for different intended purposes. This fundamental problem is also addressed by DE 20 2021 101 371 U1.

If, for example, a mixing container is to be used whose opening diameter is smaller than the external diameter of the currently mounted mixing tool, the mixing tool has to be removed and a smaller mixing tool has to be mounted. It can happen here that, although a replacement of the mixing tool would be necessary, this is not taken place. If the mixing tool is then guided to the mixing container, the mixing tool can be damaged.

Proceeding from this problem, the current disclosure is an industrial mixing machine in which possible damage to the mixing tool is prevented and using which the mixing result is improved.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

According to the present disclosure, the mixing machine has a detection device configured to check whether the mixing tool currently mounted on the mixing machine matches the mixing container provided, in which the material to be mixed is located, for example in terms of its diameter, if the mixing containers provided differ in their opening diameter. This provided mixing container is typically located in a container entrance as a provision space for the mixing tool. The container entrance is the location where a worker places the container so that the mixing container can be picked up by the mixing machine.

If the detection device determines that the mixing tool does not match with the available mixing container, it is configured to send a signal to a safety device via a communication path so that the safety device prevents the mixing tool, typically together with the mixing head, from being brought to the container. For this purpose, the safety device can in particular prevent a translational movement of the mixing container towards the mixing head. Corresponding error outputs can also be output on a display device, which informs the worker about the error status.

If the detection device determines that the mixing tool matches with the available mixing container, the safety device is not activated by the detection device.

By providing the detection device and the safety device communicating with it, the safety is increased overall, since damage to the mixing tool due to an incorrect configuration is avoided. In addition, a mixing quality that is only achievable with a specific mixing tool matching with the mixing container provided can be effectively ensured.

In one embodiment the detection device is configured to detect which mixing tool is mounted on the mixing head. In this embodiment, the detection device thus determines the mixing tool itself. For example, the mixing tool can be assigned an ID, such as a name associated with one or more properties of the mixing tool, such as its diameter. A comparison unit is assigned to the detection device, which uses the identified mixing tool to check whether it matches with the available mixing container. This can be done in a look-up table, for example. This refinement is particularly advantageous if other parameters are to be checked in addition to crash safety.

To identify the mixing tool, it can also be provided that the mixing tool has an identifier attached to the mixing tool. This identifier can be determined by means of sensors in the detection device and then evaluated. For this purpose, the identifier is determinable by the sensors.

It can thus also be provided that the detection device is configured to evaluate signals resolved by the angle of rotation of the mixing tool. In order that the detection device can identify the mixing tool, the mixing tool is rotated around its axis of rotation. This can be done by means of a drive or manually. The identifier is attached along the circumference of the mixing tool. Although only one locally measuring sensor or one locally measuring sensor unit is assigned to the detection device, a large section is available due to the rotation of the mixing tool that can be used to identify the mixing tool.

The angle of rotation resolution can be determined using a rotary angle gauge. It is also conceivable that when the mixing tool is driven by a motor, its rotational speed is measured, whereupon the angle is determined as a function of time.

One possible identifier of the mixing tool is its diameter. This is advantageous if no additional measures are to be taken to identify the mixing tool and the safety of the mixing machine is nevertheless to be increased. In this way, existing mixing tools can also be recognized without problems—without having to be retrofitted with an identifier. The diameter of the mixing tool is particularly relevant for crash safety, since this has to be compared with the opening diameter of the mixing container in order to prevent the mixing tool from coming into contact with the mixing container.

In order to determine the diameter of the mixing tool, it can be provided that the detection device has at least one light barrier, which is arranged eccentrically with respect to the pivot point of the mixing tool. In addition, the measuring direction of the light barrier is aligned with the diameter of the mixing tool. By providing a light barrier, a cost-effective determination of the mixing tool can be provided. In addition, this is contactless and can be used at a distance from the mixing tool. This is advantageous because in many cases a dust-free environment does not exist in the area of the mixing head, which could contaminate a sensor. The light barrier, on the other hand, can be arranged at a distance and protected by appropriate measures.

In another embodiment there are at least two light barriers, which are aligned essentially in parallel and are arranged eccentrically with respect to the pivot point of the mixing tool, are arranged at a distance from one another and at a different distance from the pivot point. Furthermore, the first light barrier is arranged in such a way that it measures a first mixing tool diameter. The second light barrier is arranged in such a way that it measures a second mixing tool diameter that is different from the first. In this way, two tools with different diameters can be distinguished: A smaller mixing tool is only detected by the light barrier that measures the smaller diameter, while the second light barrier, which is aligned on a larger diameter for a larger mixing tool, does not detect the small tool. If the larger mixing tool is used, this is detected by both light barriers. In this way, conclusions can be drawn about the diameter of the mixing tool.

It can be provided that the individual light barriers have such a distance from the pivot point that they measure a diameter which corresponds to the maximum permitted diameter for the different containers that may be provided. A safety margin is typically subtracted from this.

In a further embodiment, it can be provided, which is particularly advantageous if the mixing tool has mixing blades, for example three mixing blades, that two opposing light barriers measure such a diameter that is within the diameter of a larger mixing tool, but outside a smaller diameter of a smaller mixing tool. In some situations, due to the blades, a rotational situation of the mixing tool can occur, in which only one light barrier detects the mixing tool. The two opposing light barriers ensure that the mixing tool is correctly identified despite the presence of mixing tool blades.

It can also be provided that, in order to detect the diameter of the mixing tool, it is rotated about its pivot point, so that the actual diameter of the mixing tool is determined via the angular section in which the light barrier is interrupted and the known distance between the measuring direction of the light barrier and the pivot point of the mixing tool. In this way, the exact diameter can be determined with a single light barrier, so that a large number of different mixing tools is determinable.

In another embodiment, it can be provided that the identifier is a detection contour. This detection contour can be determined by contour sensors, for example by tactile sensors, inductive sensors, or ultrasonic sensors. The detection contour reflects a coding that allows conclusions to be drawn about the mixing tool.

The detection contour can be applied distributed in the circumferential direction and/or in the axial direction on the mixing tool. A specific position, for example angle-dependent, which is known with respect to the sensor of the detection device, can also be part of the detection strategy. Such a marker can be, for example, the keyway or the associated feather key.

Contour sensors can introduced easily into the feather key. An electrical connection is possible via cable bushings or rotary contacts that are typically present in any case, typically slip ring contacts. This option can also be easily retrofitted: The feather key can simply be replaced on a mixing machine as a retrofit kit, wherein the retrofitted feather key has the appropriate sensors. Codes in the form of indentations or protrusions can easily be introduced into the keyway (for example, by milling or drilling). The base of the keyway is typically used for this purpose. This is the least stressed part in the keyway, so breakage is counteracted.

It is preferably provided that indentations are used for coding. In terms of production technology, it is easier to introduce indentations into a component than to apply material to provide an protrusion.

The feather key also usually has a flat surface facing radially outwards. The contour sensors can easily be introduced into this flat surface in a defined manner. In particular, a precise distance adjustment between the key and the mixing tool, or the base of the keyway, is possible.

In another embodiment, the contour sensors can be designed as fine proximity sensors which can detect an indentation, such as a bore, introduced into the base of the keyway. As a result of this configuration, standard mixing tools in particular can be used and also retrofitted in a simple manner.

By providing an encapsulated system, in particular encapsulated against external influences such as liquids, the sensor system is safe and reliable.

It can also be provided that appropriate cabling is arranged eccentrically in the shaft, so that passing coolant centrally through the shaft is enabled.

It can also be provided that the identifier is provided by one or more magnets.

In this case, the detection device has at least one magnetic field sensor, such as a Hall probe. This magnetic field sensor and the at least one magnet attached to the mixing tool are arranged relative to one another such that the field of the magnet is measurable by the magnetic field sensor. In this way, two different mixing tools can be distinguished from one another: One mixing tool has a magnet, the other does not. To increase the measurement reliability, it can also be provided that multiple magnets are arranged along the circumference.

Furthermore, it can be provided that at least one mixing tool has a large number of magnets at a predefined distance along its circumference. To detect the mixing tool, it is rotated around its center of rotation, whereupon signals that can be evaluated are generated in the magnetic field sensor according to the distribution of the magnets. On the basis of the chronological sequence or the determined angle of rotation, an identifier is determined which allows conclusions to be drawn about the mixing tool or at least certain parameters of the mixing tool.

Furthermore, it can be provided that at least one mixing tool has an RFID chip and the detection device has an RFID sensor, wherein the RFID sensor and the RFID chip are arranged such that the RFID chip is readable by the RFID sensor. A large amount of different data can be stored in an RFID chip, so that it can be determined whether the mounted mixing tool matches with the mixing container provided. Not only can an identifier assignable to the mixing tool be stored in the RFID chip, but also parameters can be directly stored that allow conclusions to be drawn as to whether the mixing tool matches with the mixing container provided, such as its diameter. In this way, the information on the respective mixing tool can be managed decentrally on the respective mixing tool. In this way, new mixing tools do not have to be additionally input into the mixing machine or the detection device.

It can also be provided that the detection device has at least one camera directed at a mixing tool and an image evaluation unit. The camera can be designed as a photo camera that detects the mixing tool and/or can determine the diameter of the mixing tool photographically. The camera can also be designed as a scanner, which is arranged approximately at the height of the mixing tool and in this way can determine the diameter of the mixing tool.

It can also be provided that the mixing tool is determined by means of its weight: Typically, a mixing tool having a larger diameter has a higher weight than a smaller one.

It is preferably provided that the detection device is arranged in the area of the mixing head on the mixing machine, so that the sensor can detect the mounted mixing tool. In this way, a particularly high level of safety is provided, since the mounted mixing tool, which has to match the mixing container, is determined.

It can be provided that the sensor is arranged laterally to the mixing tool and is arranged outside the diameter of the mixing tool having the largest diameter. Such a sensor is typically an optical sensor, such as a light barrier, a scanner, or a camera. It is possible that the measuring direction is not parallel to the mixing tool. In this way, mixing tools of different heights can also be reliably measured. Nevertheless, it is also conceivable that the sensor is arranged in one plane with the mixing tool. This applies in particular to a scanner or a light barrier, for example. Due to the arrangement outside the diameter of the mixing tool, the sensor is protected from any dust exposure induced by the mixing.

In another embodiment it can be provided that the sensor is arranged offset in the vertical direction from the mixing tool and is arranged within the diameter of the mixing tool having the largest diameter. Such a sensor is, for example, an ultrasonic, proximity, magnetic field, or RFID sensor. Due to the small distance from the mixing tool, it is possible to determine the mixing tool more easily and accurately, in particular also in the vertical direction.

In a further embodiment, it can be provided that, in order to detect whether the mixing tool currently mounted on the mixing machine matches with the mixing container provided, at least one mixing tool to be distinguished has a detection section in its attachment area, from which at least one characteristic feature of the mixing tool can be inferred, such as whether the mixing tool currently mounted on the mixing machine matches with the container. According to the disclosure, this detection section interacts with a linkage when the mixing tool is attached to a fitting on the mixing tool. The action of the mixing tool on the linkage moves the linkage into a different position or setting. For example, it can be provided that the linkage is displaced in a translational manner by the detection section. This other setting of the linkage is detected by a measuring device, wherein it can be concluded by the detection device in dependence on the setting of the linkage whether the mixing tool mounted on the mixing head matches with the mixing container provided or not.

In other words: In order for the detection device to detect whether the mixing tool currently mounted on the mixing head matches with the mixing container to be connected to the mixing head and in which the material to be mixed is located, at least one mixing tool has in its attachment area a detection section facing toward a fitting on the mixing machine side and the mixing machine has a linkage extending from the fitting to a measuring device and the detection section of the mixing tool attached to the fitting is designed in such a way and the linkage is mounted in such a way that the detection section acts on the linkage, moving it into a different setting, which adjustment movement of the linkage is detectable by a measuring device assigned to the detection device.

The linkage has a sensor section for the action on the linkage to move the linkage by the detection section of the mixing tool. In another section, remote from the sensor section, the linkage is designed as a measuring section, using which the movement of the linkage is detectable by the measuring device. Due to the mechanical linkage and the spatial separation thus possible between the sensor section and the measuring section, the typically sensitive measuring device—often designed as electronic and/or optical—can be arranged in an area on the mixing machine in which less contamination and/or better attachability of the measuring device is provided. Typically, the distance between the sensor section and the measuring section is a few tens of centimeters. It can also be provided that the measuring device and the measuring section are sealed off from the environment in an approximately dust-tight manner.

The linkage can be in the form of a radially mounted, single rod that is translationally displaceable. One distal end, for example the end face, is typically the sensor section, the other is the measuring section. Measuring the dimension of the translational displacement of the rod can be carried out by roller switches, proximity sensors, and/or light barriers on the measuring section, wherein multiple sensors are arranged along the possible translational path of the rod, so that conclusions can be drawn about the dimension of the displacement in this way. Typically, the sensors are arranged at an equidistant distance from one another. A further possibility for designing the sensor can be a camera having an image processing unit connected thereto, so that conclusions can be drawn photographically about the characteristic change of the linkage or a new position of the linkage.

The fitting on the mixing machine for attaching the mixing tool typically has a cross section, wherein the mixing tool contacts the fitting at least in sections with its attachment area on its outer lateral surface. It is preferably provided that the linkage, or its sensor section, respectively, is accommodated within this cross section of the fitting, wherein the sensor section is set back in relation to the material surrounding the sensor section, for example provided by the fitting. The sensor section is protected from unwanted effects by the material surrounding it. Complementary thereto, the detection section is designed as a protruding pin on the mixing tool, wherein the pin engages in a detection section receptacle, typically part of a radial bearing of the linkage, if this is designed to be displaceable, and can act on the sensor section, for example displace it. In this way, reliable detection is made possible.

If it is only necessary to distinguish between two mixing tools, there is the possibility that the measuring device is only equipped with one sensor that can only determine Boolean values (a position of the linkage detected vs. a specific position not detected) and also only one mixing tool to be distinguished has a detection section acting on the sensor section of the linkage in its attachment area. If the position of the linkage detectable by the measuring device is not detected, a second mixing tool without a detection section is mounted.

It is preferably provided that the linkage has a starting position which it occupies at least when no mixing tool is mounted. It is preferably provided that the linkage automatically returns to this starting position when the mixing tool is removed from the fitting of the mixing machine. For this purpose, the linkage is supported in relation to the mixing machine by a return spring, wherein the fitting returns to its starting position due to the spring force. If the mixing tool is mounted, the return spring is pretensioned, if the mixing tool is removed, the return spring relaxes and brings the linkage back to its starting position. In this way, the measurement result is secured.

In an alternative design, the design, for example the size of the detection section of the mixing tool, corresponds to a property of the mixing tool to be checked with respect to the mixing container, for example the diameter of the mixing tool. In this way, specific detection section shapes can be defined for specific diameters. In this way, the diameter can be concluded from a movement introduced by the detection section—for example, a specific displacement—of the linkage. In this way, a modular distribution of information with respect to the mixing tool is made possible.

In this way, already existing mixing tools can also be detected without problems—without having to be input into a mixing machine separately or having to be retrofitted. In particular the diameter of the mixing tool is relevant for crash safety, since this has to be compared to the opening diameter of the mixing container in order to prevent the mixing tool from coming into contact with the mixing container.

It is preferred that the fitting of the mixing tool on the mixing machine side is the drive shaft on the mixing head. The linkage or the sensor section is then preferably arranged inside the drive shaft; the drive shaft can preferably be designed as a hollow shaft. As the driven shaft of the mixing machine, the mixing head is a part that rotates in relation to the mixing machine. The linkage, in particular a single rod, can rotate with it without any problems. The measuring device, in contrast, is typically stationary in relation to the mixing machine. The linkage preferably protrudes from the shaft with its measuring area, at least if the measuring device is to detect the linkage. Due to the mechanical transmission of the movement of the linkage through the shaft, no electrical transmission of the measurement signal via rotary sliding contacts is necessary, in contrast to a measuring unit that is connected directly to the mixing head or the drive shaft.

The linkage can be arranged centrally or eccentrically in the shaft. If the linkage is arranged eccentrically, it is provided for improved sensing on the part of the detection device that at least the measuring section, preferably also the sensor section, is mounted centrally. The translational movement can nonetheless be transferred accordingly. If the linkage is designed as a rod, it can accordingly be bent in a U-shape to provide the eccentricity, so that a first part of the rod is arranged eccentrically in the shaft and another part, namely the measuring section and possibly the sensor section, is arranged centrally and the respective adjacent parts are connected to one another by a leg.

The mixing machine can have a mixing tool storage area. In this mixing tool storage area, the mixing tool or tools that are currently not being used and are assigned to the mixing machine—thus the mixing tools that are not mounted on the mixing head—are stored on corresponding fittings on the mixing machine side. The detection device is configured to monitor the mixing tool storage area to conclude from the occupancy of the mixing tool storage area which mixing tool is mounted on the mixing head. If more than two mixing tools are assigned to the mixing machine, the detection device typically has a corresponding memory in which it is stored which mixing tools are made available to the mixing machine. The monitoring of the mixing tool storage area significantly simplifies the determination, since no dirt or the like can falsify the determination result in the mixing tool storage area. The detection then takes place in a manner indicated above.

It can also be provided that the mixing tool storage area has mixing tool storage spaces that are unique at least with regard to a specific parameter, such as the diameter, and which are typically each provided for exactly one specific mixing tool. Uniqueness can be provided, for example, by geometric contours that match with the respective mixing tool, for example by pins protruding from the plane of the mixing tool storage area, which protrude between the blades and, for example, also at their end areas, so that a larger mixing tool cannot be stored at a space of a smaller mixing tool.

In principle, the mixing tool storage area can be monitored by means of a detection device described above, to which the corresponding sensors are assigned. In addition, there is the possibility that the detection device has a proximity sensor that is configured to determine whether part of a mixing tool is in its vicinity. This particularly simple sensor only checks whether a mixing tool is present. Together with the detection device and the knowledge of the occupied mixing tool storage space, it can be determined which mixing tool is mounted on the mixing head—namely the mixing tool that is not detected at the mixing tool storage space.

The method according to the invention, which can be carried out using an industrial mixing machine as described above, comprises the following steps:

- determining the mixing tool currently mounted on the mixing head,
- determining the provided mixing container,
- checking whether the determined mixing tool matches with the provided container, and if the determined mixing tool does not match with the provided container: activating the safety device so that the mixing tool and the container openings are not brought together.

It is preferably provided that the mixing machine has least one spindle drive outside the diameter of the mixing tool, using which the mixing container provided can be pulled toward the mixing tool or the mixing head so that the mixing tool plunges into the container opening. Typically, mixing containers of different diameters also have different heights. It can then be provided that, in order to check whether the mixing container determined actually corresponds to the mixing container provided, the spindle drives move to the corresponding, expected height in order to capture the mixing container at a predefined point. If the height moved to corresponds to the provided mixed container, in all probability the determined mixed container corresponds to the provided container, so that a high level of safety is ensured In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
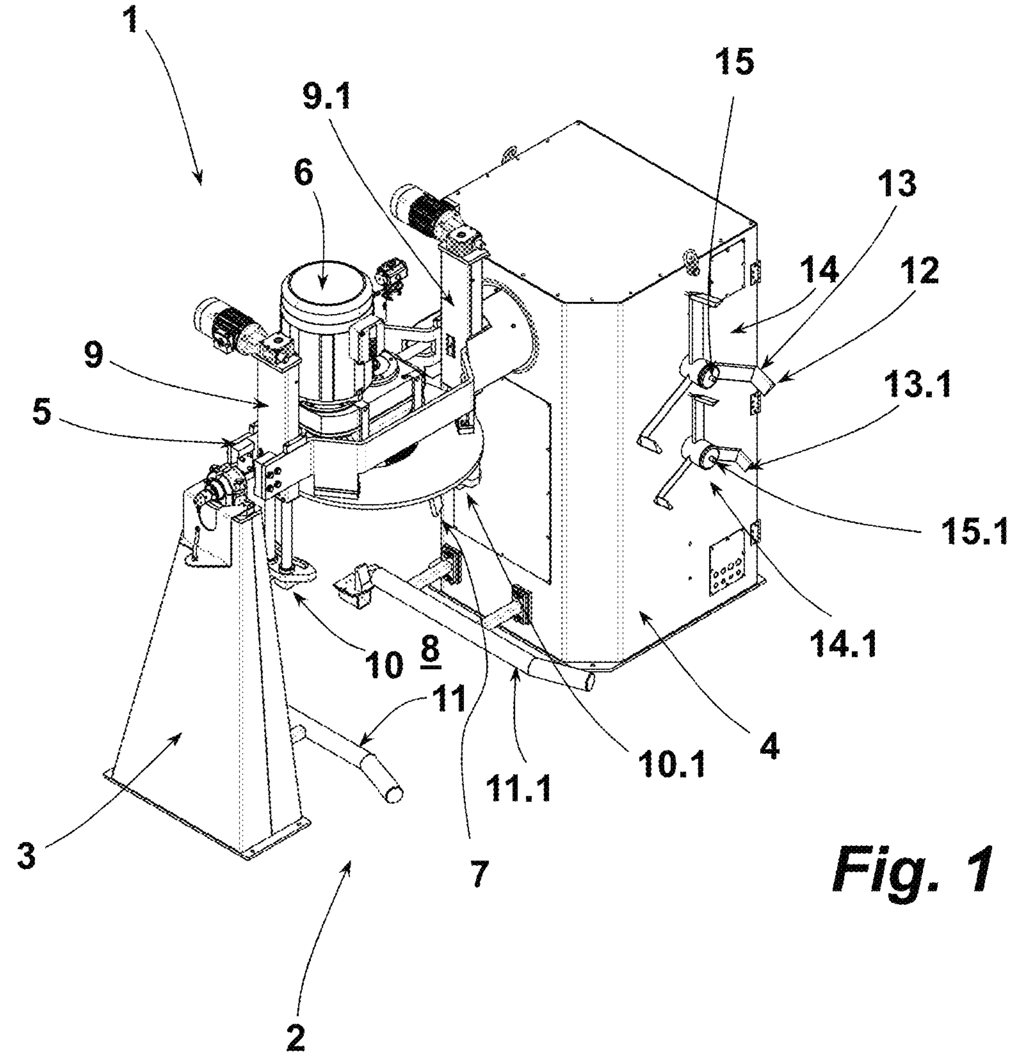
FIG. 1 shows an industrial mixing machine having a mixing head and a mixing tool storage area.

FIG. 1 shows an industrial mixing machine 1. The industrial mixing machine 1 has a frame 2, comprising a first support 3 and a second support 4, which are connected in their upper areas by a mixing traverse 5. The mixing traverse 5 has a mixing drive 6, using which a mixing tool mounted on a mixing head 7, which cannot be seen in FIG. 1 because it is concealed, is driven. The mixing machine 1 has a container entrance 8 located under the mixing traverse 5. A mixing container, not shown here, in which the material to be mixed is located, it is moved by a worker into the container entrance 8 and positioned. Such a mixing container moved into the container entrance 8 is a provided mixing container, ready to be picked up by the mixing machine 1 in order to mix its contents. To pick up the mixing container, the mixing machine 1 has two laterally arranged spindle drives 9, 9.1 having lifting plates 10, 10.1 connected to them, which engage under an outwardly projecting flange plate of the mixing container, so that the mixing container can be brought toward the mixing head 7 and thus to the mixing tool 1 by means of the spindle drives 9, 9.1.

In order that the mixing container is aligned with respect to the mixing tool 1, the container entrance 8 has lateral guide rods 11, 11.1 mounted near the ground.

If the mixing container is held on the mixing head 7 by means of the spindle drives 9, 9.1 or the lifting plates 10, 10.1, respectively, the mixing traverse 5 is tilted around its longitudinal axis, mounted on the supports 3, 4, so that the mixing container is brought into an inverted position. The mixing drive 6 is activated, which mixes the material to be mixed in the mixing container by means of a mixing tool mounted on the mixing head 7 and not shown in detail here.

The mixing machine 1 has on one side support 4 a mixing tool storage area 12 in which mixing tools 13, 13.1 are stored at mixing tool storage spaces 14, 14.1 when they are not mounted on the mixing head 7. For this purpose, the mixing tool storage spaces 14, 14.1 have receiving pins 15, 15.1, using which the mixing tools 13, 13.1 are held at their pivot point.

To ensure a specific mixing quality and/or to prevent the mixing tool from coming into contact with the mixing container and being damaged as a result, it is provided that the mixing machine 1 determines by means of a detection device which mixing tool is currently mounted on the mixing head 7. To determine the mixing tool mounted on the mixing head 7, this can be determined directly on the mixing head 7 or it can be determined which mixing tool storage space 14, 14.1 is occupied in the mixing tool storage area 12 in order to draw conclusions therefrom as to which of the mixing tools 13, 13.1 is mounted on the head 7.

FIGS. 2 to 9 show various embodiments for detecting the mixing tool, whether on the mixing head 7 or in the mixing tool storage area 12. It is obvious that, even if in the following explanations the determination takes place on the mixing head 7 or in the mixing tool storage area 12, mutatis mutandis the detection can also take place in the respective other area. Identical parts are denoted by the same reference signs hereinafter. Only with regard to differently designed mixing tools is a separate letter used as a suffix with regard to the mixing tool for each design.

Figure 2:
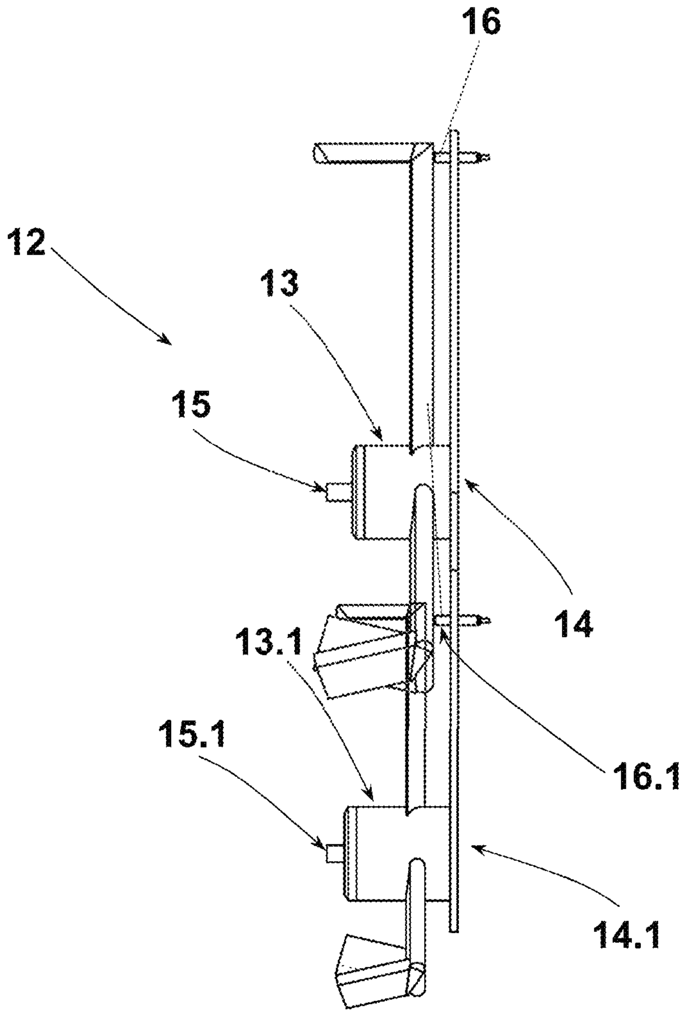
FIG. 2 shows details of the mixing tool storage area of the mixing machine shown in FIG. 1 having a detection device according to a first embodiment.

FIG. 2 shows a possible detection of mixing tools 13, 13.1, stored at mixing tool storage spaces 14, 14.1 of the mixing tool storage area 12 shown in FIG. 1. The two mixing tools 13, 13.1 are stored at their mixing tool storage spaces 14, 14.1 essentially in one plane in this embodiment. The distance between the receiving pins 15, 15.1 is smaller than the radius of the larger mixing tool 13 and larger than the radius of the smaller mixing tool 13.1. In this way, the larger mixing tool 13 can only be placed on a mixing tool storage space 14 (here the upper one) if it is forced that a blade of the mixing tool 13, 13.1 is aligned with the receiving pins 15, 15.1. In order to force such an alignment, it can be provided that proximity sensors 16, 16.1 are aligned with the receiving pins 15, 15.1. If no mixing tool—or no blade of one of the two mixing tools—is detected by the proximity sensors 16, 16.1, an error message or the like is output. As is the case here, the proximity sensors 16, 16.1 are preferably spaced apart far enough from the receiving pins 15, 15.1 that they are directed towards the end area of the respective mixing tool 13, 13.1. If the smaller mixing tool 14.1 were placed on the mixing tool storage space 14 actually assigned to the larger mixing tool 13, the proximity sensor 16 would not be triggered. In this way, mixing up the mixing tools 13, 13.1 with regard to their mixing tool storage spaces 14, 14.1 is prevented by a clever combination of geometric factors and the arrangement of the sensors. This optimized design is a particularly cost-effective design that requires few additional parts. The proximity sensors 16, 16.1 can moreover—advantageously—be assigned to the detection device of the mixing machine 1, wherein the proximity sensors 16, 16.1 are used to determine whether the respective mixing tool 13, 13.1 is held at its mixing tool storage space 14, 14.1.

Figure 3:
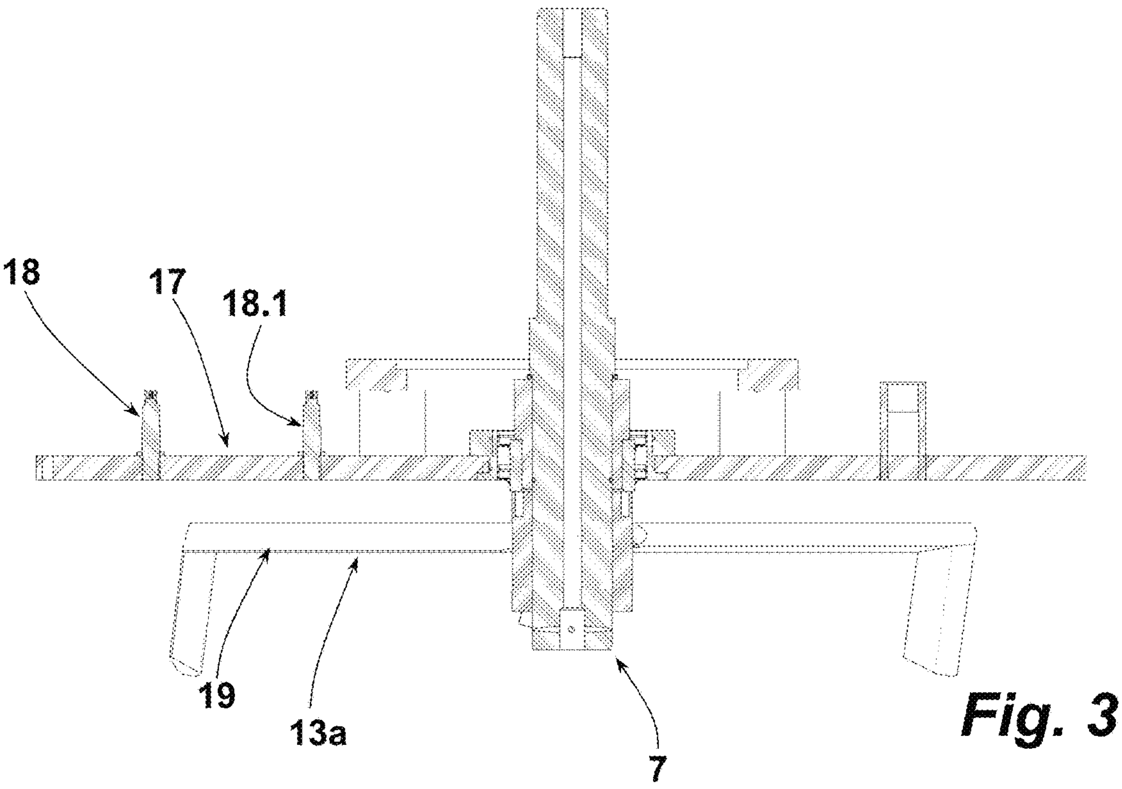
FIG. 3 shows a mixing tool mounted on the mixing head of the mixing machine shown in FIG. 1 having a detection device according to a second embodiment.

FIG. 3 shows the mixing machine 1 in a different configuration: Here the mixing tool 13*a* is mounted on the mixing head 7 or on the shaft of the mixing drive 6, respectively. Ultrasonic sensors 18, 18.1 are arranged in the flange plate 17 associated with the mixing head 7. These ultrasonic sensors 18, 18.1 are arranged at different diameters in relation to the shaft of the mixing drive 6, and therefore in relation to the pivot point of the mixing tool 13*a* mounted on the mixing head 7; a first ultrasonic sensor 18 is aligned on a wider diameter than a second ultrasonic sensor 18.1. Starting from the flange plate 17, the ultrasonic sensors measure pointing downward in the direction of the mixing tool 13*a*.

To measure the mixing tool 13*a*, the mixing tool 13*a* is rotated so that a blade 19 is arranged below the ultrasonic sensors 18, 18.1 and can be measured by them. To rotate the mixing tool 13*a*, this can be done manually by a worker; it is also possible for the mixing tool 13*a* to be driven by means of the mixing drive 6 or a separate drive, which is not shown in detail here. A corresponding signal from the ultrasonic sensors 18, 18.1, which report whether a mixing tool 13*a* is detected below them, can be used to determine the diameter of the mixing tool 13*a* in order to check whether the mounted mixing tool 13*a* matches with the mixing container provided.

Figure 4:
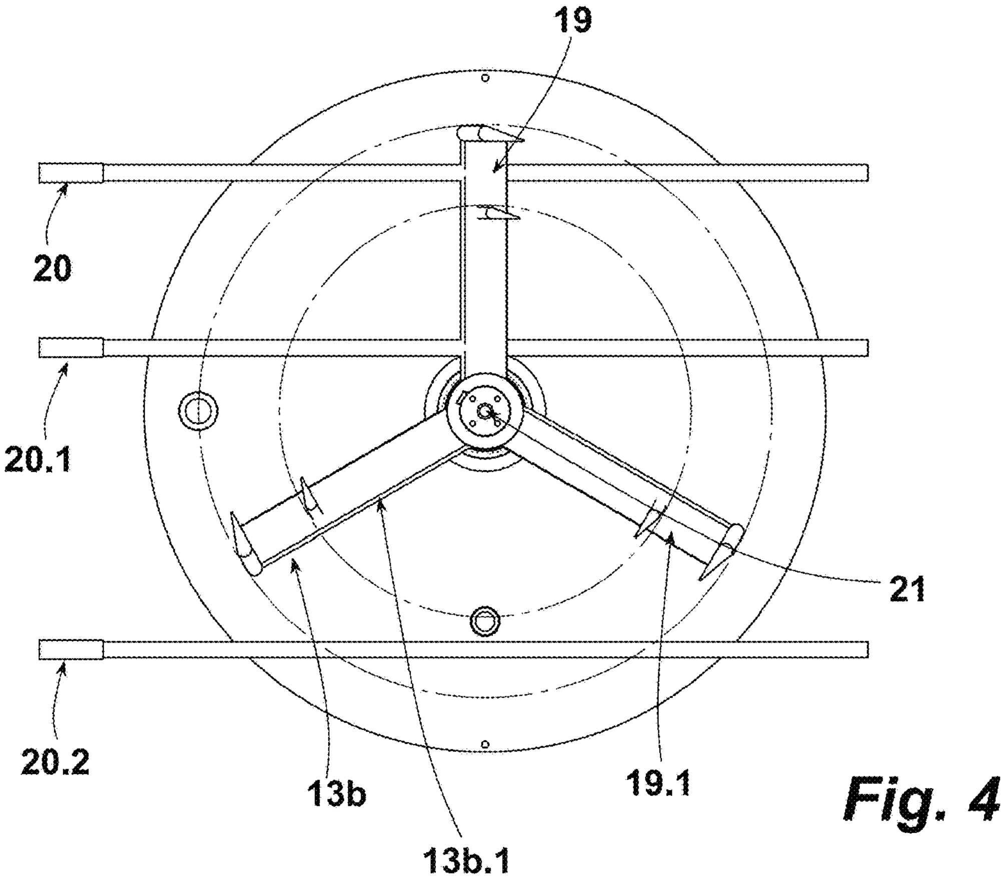
FIG. 4 shows a mixing tool mounted on the mixing head of the mixing machine shown in FIG. 1 having a detection device according to a third embodiment.

Another embodiment is shown in FIG. 4. In FIG. 4, two mixing tools 13*b*, 13*b*.1 arranged one above the other are shown to visualize the measuring method. The first mixing tool 13*b* has a larger diameter than the second mixing tool 13*b*.1. To measure the mixing tools 13*b*, 13*b*.1, three light barriers 20, 20.1, 20.2 are arranged in this embodiment in such a way that their measuring direction is aligned with the diameter of the two mixing tools 13*b*, 13*b*.1. Furthermore, the measuring directions are aligned in parallel and have different distances to the pivot point 21 of the mixing tools 13*b*, 13*b*.1. The measuring directions of two light barriers 20, 20.2 are aligned opposite with respect to the pivot point 21. With this configuration it is possible to distinguish the mixing tools 13*b*, 13*b*.1 from one another without the mixing tools 13*b*, 13*b*.1 having to be rotated: If the mixing tool 13*b* is in a position as shown in FIG. 4, the blade 19 is detected by the first light barrier 20. The mixing tool 13*b* is not detected by the light barrier 20.2. If the mixing tool 13*b* were in a different rotational position, in contrast to the rotational position shown, so that the blade 19 would not be detected by the light barrier 20, the mixing tool 13*b*, or for example the blade 19.1, would be detected by the opposite light barrier 20.2.

The two outer light barriers 20, 20.2 are at such a distance from the pivot point 21 that they never detect the smaller mixing tool 13*b*.1.

Figure 5:
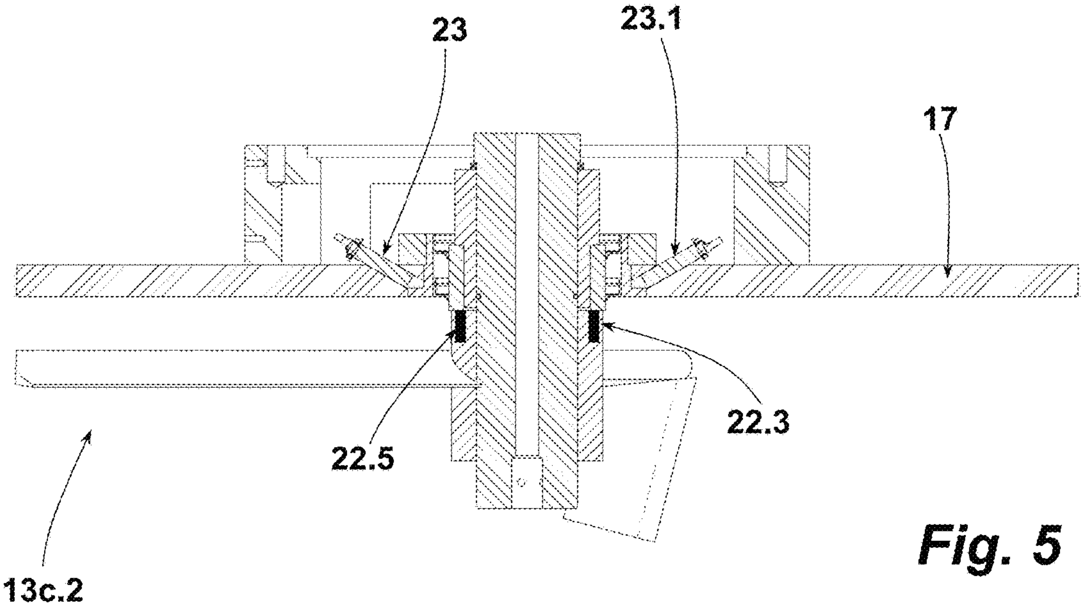
FIG. 5 shows a mixing tool mounted on the mixing head of the mixing machine shown in FIG. 1 having a detection device according to a fourth embodiment.
Figure 5A:
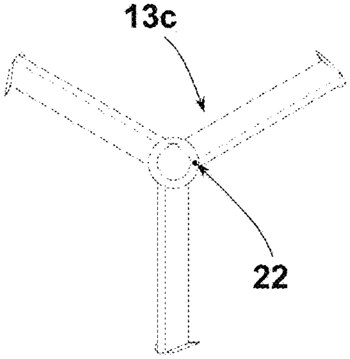
FIGS. 5*a-c* show possibilities for coding a mixing tool for a detection device according to the fourth embodiment shown in FIG. 5.
Figure 5B:
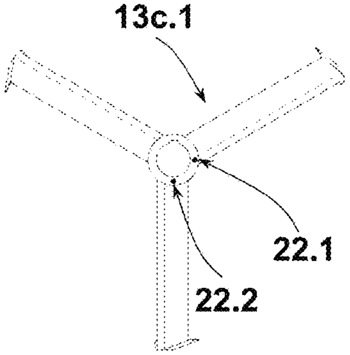
Figure 5C:
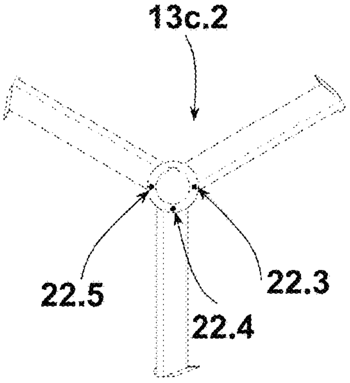

In a further embodiment, FIG. 5 shows a detection of mixing tools by means of magnets. Different mixing tools 13*c*, 13*c*.1, 13*c*.2 have magnets 22, 22.1, 22.2, 22.3, 22.4, 22.5 at different positions—resulting in a unique combination of distances. The detection device has Hall sensors 23, 23.1 which are arranged here on the flange plate 17 and which are directed towards the magnets 22.3, 22.5 of the mixing tool 13*c*.2 mounted here by way of example. By rotating the mixing tool 13*c*.2, the individual magnets 22, 22.1, 22.2, 22.3, 22.4, 22.5 are detected in succession depending on the angle of rotation of the mixing tool 13*c*.2. From this it can be concluded which mixing tool 13*c*.2 is involved, so that it can be determined whether the mounted mixing tool 13*c*.2 matches with the mixing container provided.

Figure 6:
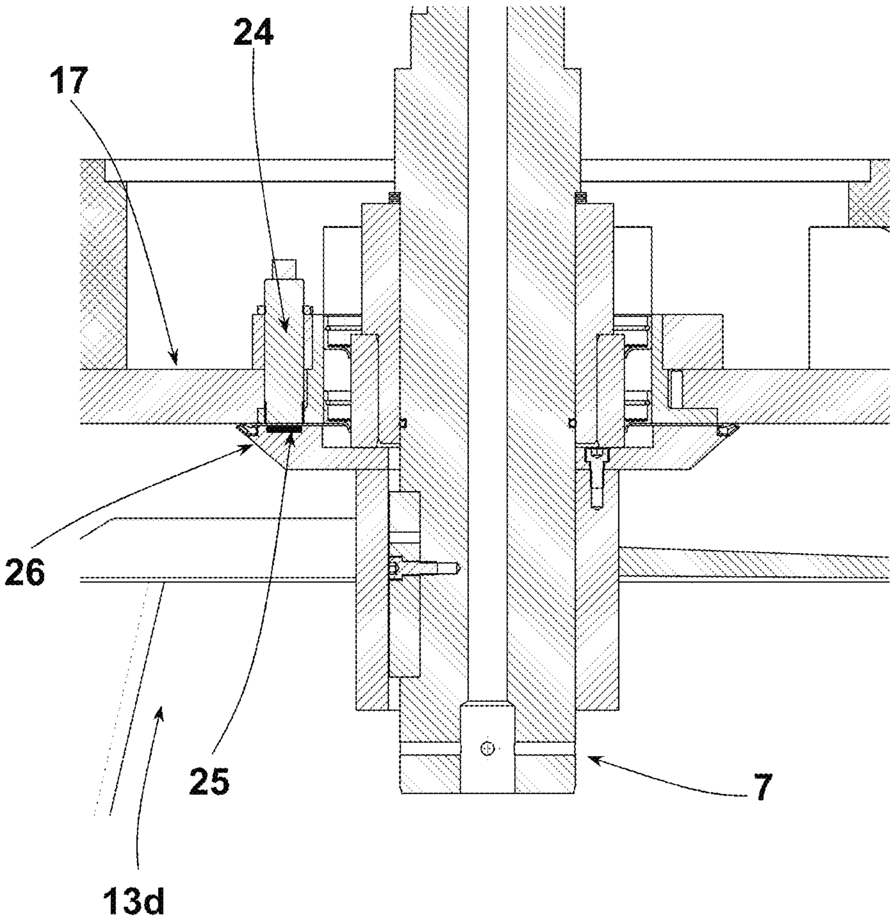
FIG. 6 shows a mixing tool mounted on the mixing head of the mixing machine shown in FIG. 1 having a detection device according to a fifth embodiment.

FIG. 6 shows a further embodiment which is based on RFID technology. The flange plate 17 has an RFID sensor 24; the mixing tool 13*d* has an RFID chip 25. If the mixing tool 13*d* is mounted on the mixing head 7, a sealing ring 26 presses, for example, against the flange plate 17 in order to seal off the area in which the RFID chip 25 is arranged and in particular to keep it free of dust. By reading the RFID chip by way of the RFID sensor, the corresponding information can be read in order to draw conclusions about the mounted mixing tool 13*d*.

Figure 7:
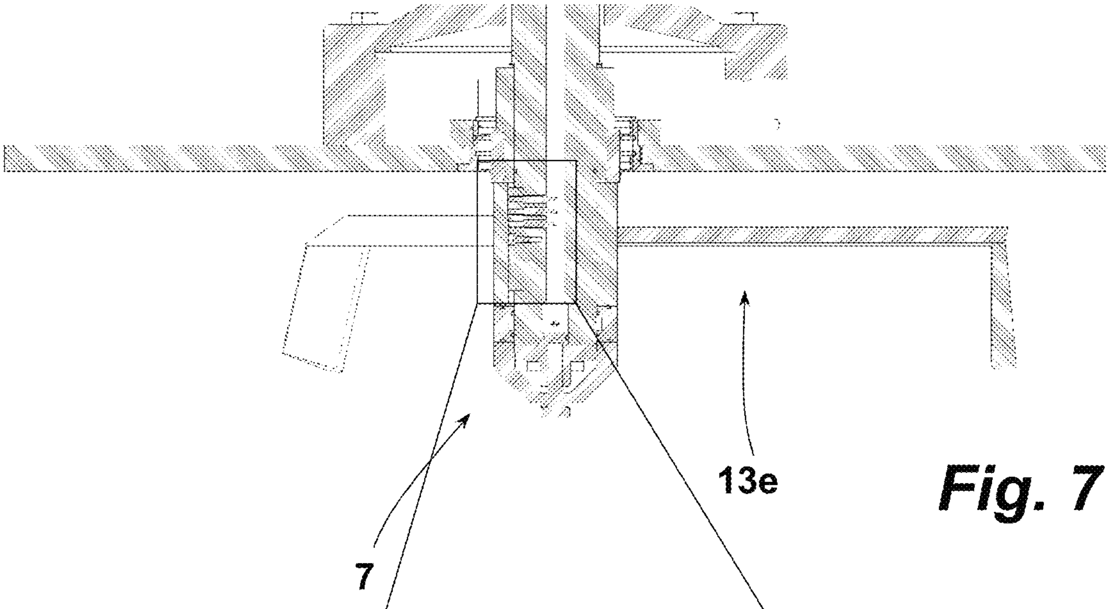
FIG. 7 shows a mixing tool mounted on the mixing head of the mixing machine shown in FIG. 1 having a detection device according to a sixth embodiment.
Figure 7A:
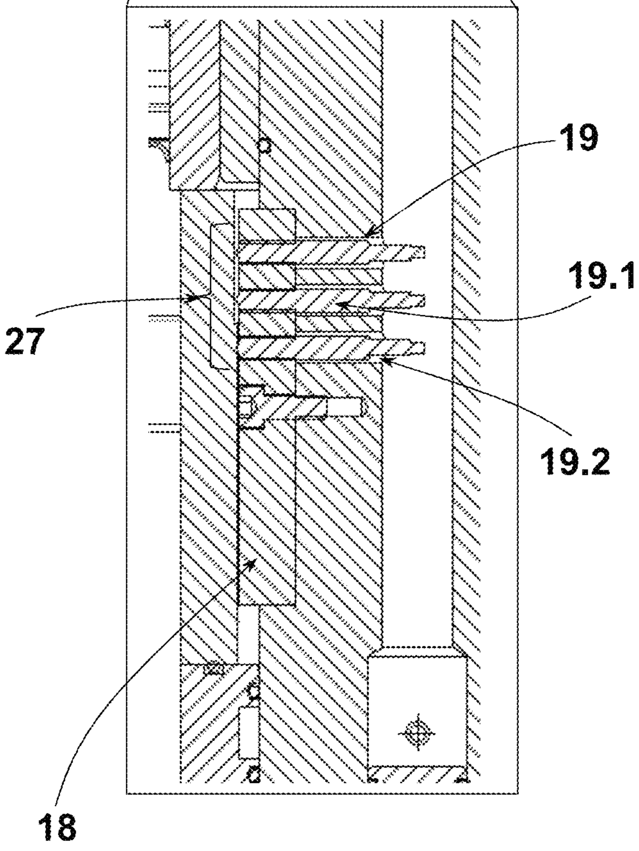
FIG. 7*a* shows a detailed view of the mixing head shaft of the embodiment shown in FIG. 7.

FIG. 7 shows a further embodiment, wherein the detection of the mixing tool 13*e* mounted here on the mixing head 7 is detected by a detection contour (identified by reference sign 27 in an enlarged view in FIG. 7*a*) inside the mixing tool 13*e*. In this case, the detection contour 27 is an indentation introduced into the material. In the feather key 28 of the drive shaft of the mixing drive 6, tactile sensors 29, 29.1, 29.2 are arranged. While the two top tactile sensors 29, 29.1 detect the indentation 27 of the detection contour, the bottom tactile sensor 29.2 detects a protrusion of the detection contour in this case. This is used to identify the mixing tool 13*e*.

Figure 8:
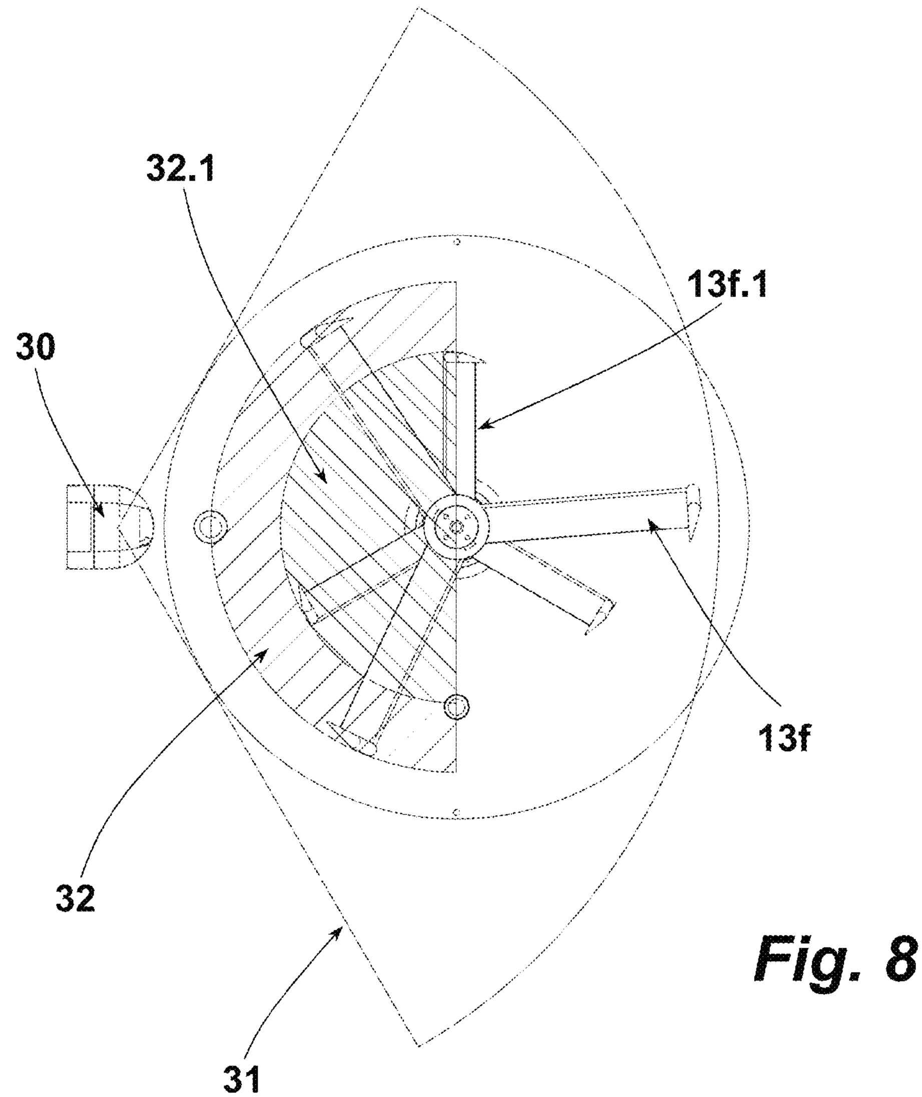
FIG. 8 shows a mixing tool mounted on the mixing head of the mixing machine shown in FIG. 1 having a detection device according to a seventh embodiment.
Figure 8A:
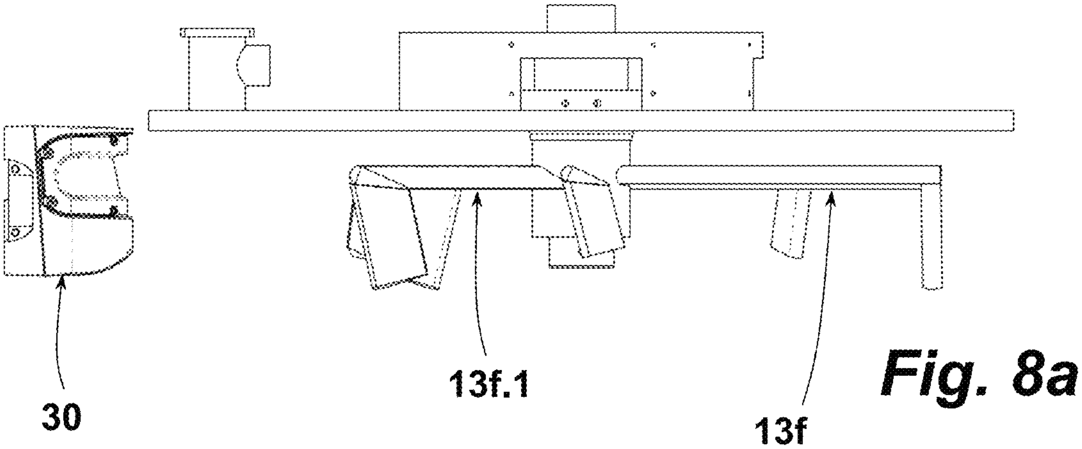
FIG. 8*a* shows the embodiment shown in FIG. 8 in a side view.

FIG. 8 shows an embodiment in which mixing tools 13*f*, 13*f*.1 (which are again shown simultaneously in this view) are detected by a scanner 30. The scanner 30 scans an area 31 and determines the corresponding diameter of the mixing tool in this area (identified here by reference sign 32, 32.1). A side view of this configuration is shown in FIG. 8*a*. It can be seen that the scanner 30 is at the same level as the mixing tools 13*f*, 13*f*.1, so that the scanner 30 can register the mixing tools 13*f*, 13*f*.1.

Figure 9:
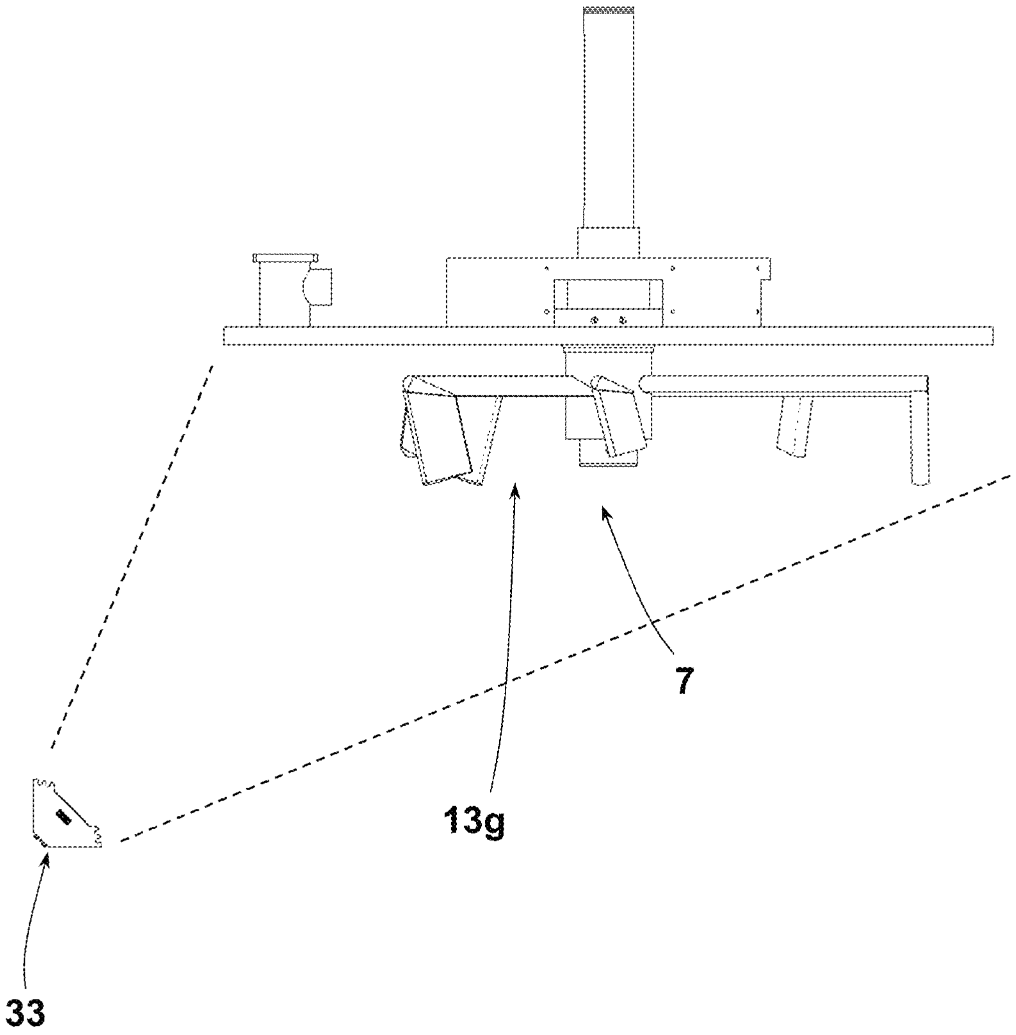
FIG. 9 shows a mixing tool mounted on the mixing head of the mixing machine shown in FIG. 1 having a detection device according to an eighth embodiment.

FIG. 9 shows a configuration in which the mixing tool 13*g* mounted on the mixing head 7 is detected by a camera system 33 via optical imaging methods.

If the mixing tool 13-13*g*, which is mounted on the mixing head 7, is detected—for example according to one of the embodiments described above—it is determined whether the mixing tool 13-13*g* matches with the provided mixing container, which in this embodiment has entered the container entrance 8. In particular, it is checked whether the diameter of the mixing tool 13-13*g* matches with the container opening, so that contact between the mixing tool 13-13*g* and the mixing container is avoided. If the check is positive, meaning that the mounted mixing tool 13-13*g* matches with the mixing container provided, the mixing container is moved up to the flange plate 17 so that the mixing tool 13-13*g* plunges into the container opening. The mixing process then begins.

Figure 10:
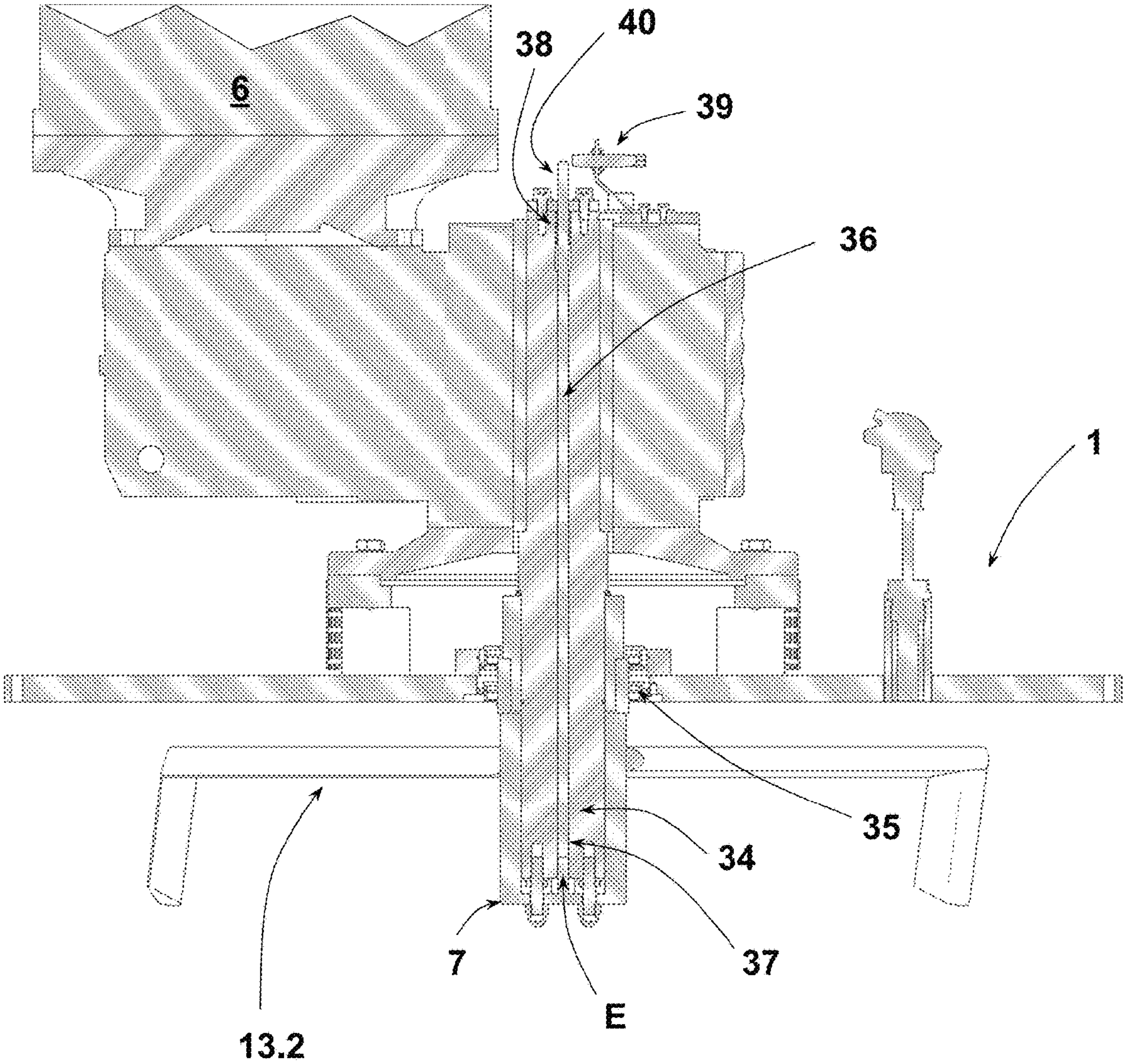
FIG. 10 shows a sectional view of a part of the mixing machine.

FIG. 10 shows a mixing tool 13.2 mounted on a fitting of the mixing machine 1, namely on the drive shaft 34. The mixing tool 13.2 has a detection section E in the form of a pin, which protrudes from the material surrounding the detection section E. The detection section E penetrates into the drive shaft 34, which is designed here as a hollow shaft. The drive shaft 34 is mounted radially on the outside on a bearing arrangement 35. In the center of the drive shaft 34 a linkage 36, designed here as a rod, is used. The linkage 36 penetrates the drive shaft 34. The linkage 36 is surrounded at least in sections in the radial direction by the drive shaft 34 and is thus mounted and displaceable in a translational manner.

The detection section E acts on a distal end of the linkage 36, on the so-called sensor section 37, formed here by the end face of the rod. By mounting the mixing tool 13.2 on the drive shaft 34, the linkage is displaced in a translational manner, here in a vertical upward direction, into a different position. The displacement takes place against the spring force of a restoring spring 38, against which the linkage 36 is mounted relative to the mixing machine 1 in the displacement direction. Using the measuring device 39 designed as a proximity sensor, the detection device of the mixing machine 1 connected to the measuring device 39 detects whether the linkage 36 or the measuring section 40, therefore: the distal end of the linkage 36 opposite to the sensor section 37, protrudes far enough from the drive shaft 34 that it can be concluded that the detection section E of the mixing tool 13.2 acts on the sensor section 37 of the linkage 36. In this way, the mounted mixing tool 13.2 can be inferred.

Figure 11:
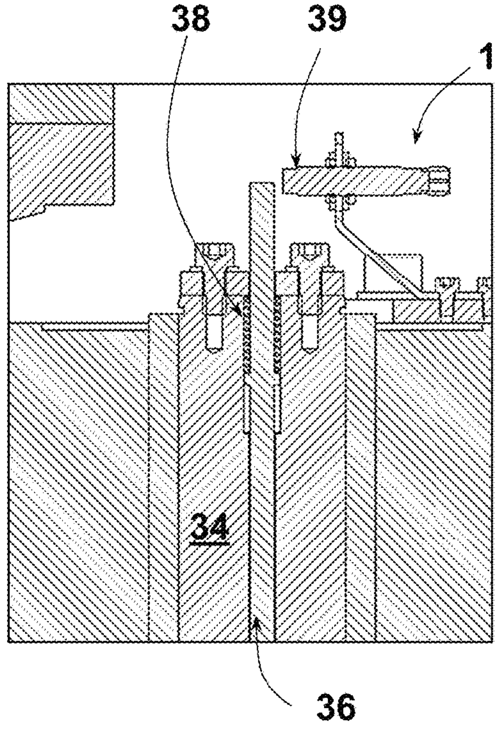
FIGS. 11 and 12 show enlarged representations of the mixing machine, on the mixing head of which a first mixing tool is mounted.
Figure 13:
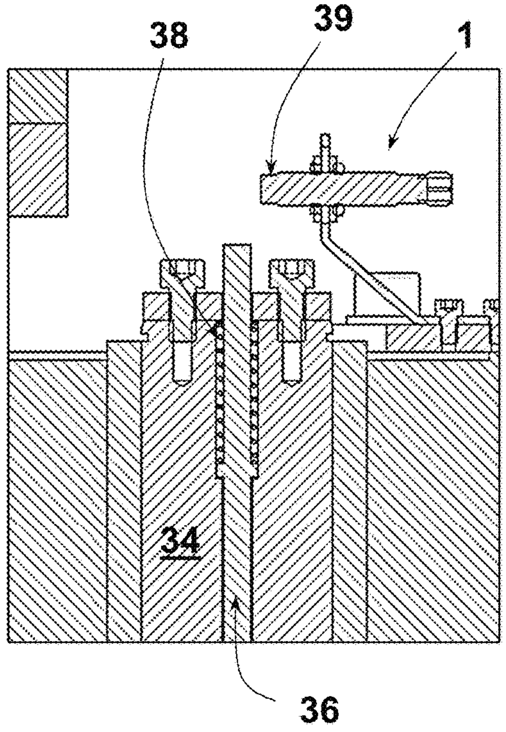
FIGS. 13 and 14 show the views of FIGS. 11 and 12, but of a mixing machine to which another mixing tool is attached.
Figure 12:
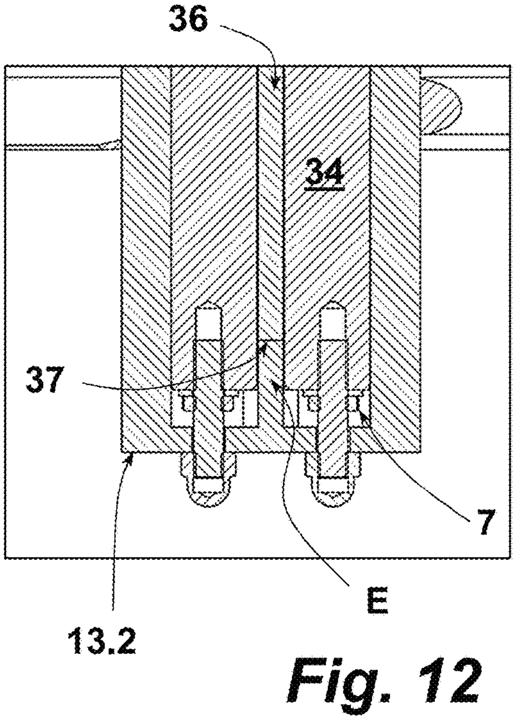
Figure 14:
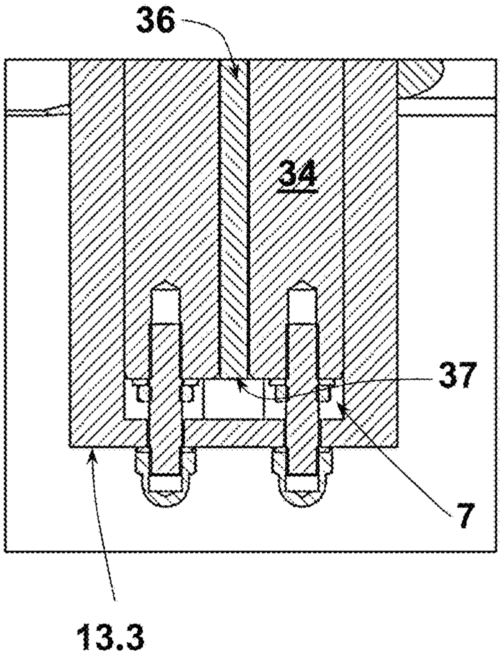

FIGS. 11 to 14 show detail snapshots of two different mixing tools: a first mixing tool 13.2 (FIGS. 11 and 12) and a second mixing tool 13.3 (FIGS. 13 and 14) differing therefrom, each attached to the mixing machine 1. FIGS. 11 and 13 show the upper area of the mixing machine 1 (which is also shown in FIG. 10), in FIGS. 12 and 14 show the lower area, namely the area to which the mixing tool 13.2, 13.3 is attached.

The two mixing tools 13.2 and 13.3 differ in their maximum diameter. They also differ accordingly in their detection section: While the first mixing tool 13.2 has a detection section E, the second mixing tool 13.3 does not have this. Correspondingly, the linkage 36 is displaced translationally by the detection section E of the first mixing tool 13.2 in the drive shaft 34 (see FIG. 11), while it is not displaced in the case of the second mixing tool 13.3 (see FIG. 13). If the first mixing tool 13.2 is mounted, the measuring device 39 (designed as a proximity sensor) detects that the linkage 36 has been brought into its vicinity; this is exactly what is not the case with the embodiment of FIGS. 13 and 14 (other mixing tool 13.3 mounted). In this way, the two mixing tools 13.2 and 13.3 can be distinguished.

This distinction is assisted by the restoring force of the restoring spring 38, which moves the linkage 36 into its starting position shown in FIGS. 13 and 14 against the translational displacement by the detection section E when the detection section E no longer engages in the driveshaft 34 due to a mixing tool change.

Advantageously, the drive shaft 34 with the mixing tool 13.2, 13.3 mounted thereon can be set in a rotational movement without any problems, without the measuring device 39 being impaired in its measurement thereby or additional electrical contacts, for example via slip ring contacts, having to be led from the attachment of the mixing tool 13.2, 13.3. Due to the central arrangement of the linkage 36 in the center of the drive shaft 34, it also does not act as an eccentric imbalance that negatively influences smooth operation of the mixing tool 13.2, 13.3.

The invention has been described on the basis of exemplary embodiments. Numerous further embodiments for implementing the inventive concept without departing from the scope of the invention set out in the claims are apparent to a person skilled in the art, without these having to be explained in greater detail in the context of these explanations.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The above definitions are provided to clarify their specific use in the context of the invention.

List of reference signs

| | |
|---|---|
| 1 | mixing machine |
| 2 | frame |
| 3 | first support |
| 4 | second support |
| 5 | mixing traverse |
| 6 | mixing drive |

-continued

| List of reference signs | |
|---|---|
| 7 | mixing head |
| 8 | mixing container entrance |
| 9, 9.1 | spindle drive |
| 10, 10.1 | lifting plate |
| 11, 11.1 | guide rod |
| 12 | mixing tool storage area |
| 13, 13.1, 13a, 13b, 13b.1, 13c, 13c.1, 13c.2, 13d, 13e, 13f, 13f.1, 13g | mixing tool |
| 14, 14.1 | mixing tool storage space |
| 15, 15.1 | receiving pin |
| 16, 16.1 | proximity sensor |
| 17 | flange plate |
| 18, 18.1 | ultrasonic sensors |
| 19, 19.1 | blade |
| 20, 20.1, 20.2 | light barrier |
| 21 | pivot point |
| 22, 22.1, 22.2, 22.3, 22.4, 22.5 | magnet |
| 23, 23.1 | Hall sensor |
| 24 | RFID sensor |
| 25 | RFID chip |
| 26 | gamma ring |
| 27 | detection contour |
| 28 | feather key |
| 29, 29.1, 29.2 | tactile sensor |
| 30 | scanner |
| 31 | scanning area |
| 32, 32.1 | diameter |
| 33 | camera system |
| 34 | drive shaft |
| 35 | radial bearing |
| 36 | linkage |
| 37 | sensor section |
| 38 | restoring spring |
| 39 | measuring device |
| 40 | measuring section |
| E | detection section |

We claim:

1. An industrial mixing machine for mixing material to be mixed, comprising:

at least two mixing containers that differ in at least one design feature from each other, wherein each mixing container has an opening on a connection side thereof and is attachable in each case to a mixing head of the mixing machine for mixing material to be mixed contained therein;

at least two mixing tools that differ in at least one design feature from each other and are mountable on the mixing head of the mixing machine;

a detection device configured to determine whether the mixing tool currently mounted on the mixing head matches with the mixing container which is to be connected to the mixing head and in which a material to be mixed is located; and a safety device in communication with the detection device, wherein the safety device prevents the mixing tool and the opening of the mixing container from being brought together when the detection device detects that the mixing tool mounted on the mixing head does not match with the mixing container.

2. The industrial mixing machine of claim 1, wherein the detection device is configured to detect which mixing tool is mounted on the mixing head.

3. The industrial mixing machine of claim 1, wherein the detection device has sensors, and at least one mixing tool has an identifier determinable by the sensors and distinguishable from the other mixing tool.

4. The industrial mixing machine of claim 3, wherein the identifier is an identification contour.

5. The industrial mixing machine of claim 4, wherein a feather key is arranged on the mixing head or on a shaft driving the mixing tool, wherein, in a mounted state, the feather key abuts a keyway on a side of the mixing tool in a formfitting manner to transmit a torque from the shaft to the mixing tool, and wherein the feather key has at least one contour sensor.

6. The industrial mixing machine of claim 1, wherein the detection device is configured to evaluate signals resolved by an angle of rotation of the mixing tool.

7. The industrial mixing machine of claim 3, wherein the identifier is a diameter of the mixing tool.

8. The industrial mixing machine of claim 7, wherein the detection device has at least one light barrier which is arranged eccentrically with respect to a pivot point of the mixing tool, and a measuring direction of the light barrier is aligned with the diameter of the mixing tool.

9. The industrial mixing machine of claim 8, wherein at least two light barriers, which are aligned in parallel and arranged eccentrically with respect to the pivot point of the mixing tool, are arranged at a distance from one another and at a different distance from the pivot point, wherein a first light barrier of the light barriers measures a first mixing tool diameter and a second light barrier of the light barriers measures a second mixing tool diameter which is different from the first mixing tool diameter.

10. The industrial mixing machine of claim 3, wherein the sensors are tactile sensors, inductive sensors, or ultrasonic sensors.

11. The industrial mixing machine of claim 1, wherein a sensor of the detection device is arranged in an area of the mixing head on the mixing machine.

12. The industrial mixing machine of claim 1, wherein the mixing machine has a mixing tool storage area on which at least one mixing tool not mounted on the mixing head is stored during use of the mixing machine, and the detection device is configured to monitor the mixing tool storage area in order to determine from an occupancy of the mixing tool storage area which mixing tool is mounted on the mixing head.

13. The industrial mixing machine of claim 12, wherein the mixing tool storage area has mixing tool storage spaces which are each provided for precisely one specific mixing tool.

14. The industrial mixing machine of claim 12, wherein the detection device has a proximity sensor which is configured to determine whether a part of a mixing tool is in its vicinity.

15. A method carried out using an industrial mixing machine according to claim 1, comprising the following steps:

determining the mixing tool currently mounted on the mixing head, determining the mixing container provided for mixing, checking whether the determined mixing tool matches with the provided mixing container, and if the determined mixing tool does not match with the provided mixing container:

activating the safety device so that the mixing tool and the opening of the mixing container are not brought together.

16. A method carried out using an industrial mixing machine, comprising the following steps:

determining a mixing tool currently mounted on a mixing head of the mixing machine, determining a mixing container provided for mixing material contained therein, checking whether the determined mixing tool matches with the provided mixing container, and if the determined mixing tool does not match with the provided mixing container:

activating a safety device of the mixing machine so that the mixing tool and an opening of the mixing container are not brought together.

* * * * *